United States Patent [19]
Hawkins et al.

[11] Patent Number: 5,709,369
[45] Date of Patent: Jan. 20, 1998

[54] SELF-ALIGNING VALVE DISC ASSEMBLY

[75] Inventors: James Chester Hawkins, Allen; Daniel Gunder Roper, Lucas; David Edward Woollums, Frisco; David Blair Davis, Whitewright; Shane Nicholson, McKinney; Justin Wade Hart, Richardson, all of Tex.

[73] Assignee: Fisher Controls International, Inc., Clayton, Mo.

[21] Appl. No.: 675,937

[22] Filed: Jul. 5, 1996

[51] Int. Cl.⁶ .................................................. F16K 25/00
[52] U.S. Cl. ............................................................. 251/86
[58] Field of Search ................................ 251/86, 84, 87; 137/527.4

[56] References Cited

U.S. PATENT DOCUMENTS

| | | | |
|---|---|---|---|
| 854,698 | 5/1907 | Martell | 251/86 X |
| 924,432 | 6/1909 | Cornelius | 251/86 X |
| 2,740,425 | 4/1956 | Garland | 251/86 X |
| 2,919,884 | 1/1960 | Meusy | 251/86 |
| 3,510,100 | 5/1970 | Makusay et al. | 251/86 X |
| 4,741,360 | 5/1988 | Affeldt et al. | 251/87 X |
| 5,402,820 | 4/1995 | Duffy et al. | |

FOREIGN PATENT DOCUMENTS

| 27924 | 9/1924 | France | 251/86 |
|---|---|---|---|

OTHER PUBLICATIONS

Fisher Controls International, Inc. *Type 95H—Disc Assembly*, 1971.

Fisher Controls International, Inc. *Type 4660—Nozzle/Flapper Assembly*, 1982.

Fisher Controls International, Inc. *Type S102C—Disc Assembly*, 1983.

*Primary Examiner*—Kevin Lee
*Attorney, Agent, or Firm*—Marshall, O'Toole, Gerstein, Murray & Borun

[57] ABSTRACT

A self-aligning valve disc assembly for a fluid regulator valve. A disc holder includes a central, raised protrusion enabled in one embodiment by a cone-shaped floor surface for providing a single point of contact with a disc. The single contact point provides a pivoting action with a point of force inside the diameter of the opposing force of the valve seat. This enables the pivoting action of the disc to self-align the disc to the seating surface so as to reduce the forces required for the regulator to function properly.

6 Claims, 2 Drawing Sheets

SELF-ALIGNING VALVE DISC ASSEMBLY

This invention relates generally to fluid pressure regulators and more particularly to a self-aligning valve disc assembly for use in a fluid pressure regulator.

BACKGROUND OF THE INVENTION

Fluid pressure regulators, such as gas pressure regulators, are commonly used in fluid pipeline systems to assist in maintaining system load pressures within acceptable limits. The primary function of a gas pressure regulator is to match the flow of gas through the regulator to the demand for gas placed on the system to keep the pressure of the gas downstream of the regulator at a constant pressure or, at least, within acceptable pressure limits.

Many known gas pressure regulators, such as the gas pressure regulator disclosed in Duffy, et al., U.S. Pat. No. 5,402,820, include a diaphragm assembly having one side thereof exposed to the downstream gas pressure and having the other side thereof biased by a predetermined pressure produced by an adjustable control spring. In these systems, the diaphragm is coupled to a pivoting lever which, in turn, throttles a valve disc with respect to an orifice so as to communicate gas from a gas inlet of the regulator to a gas outlet of the regulator. In particular, movement of the diaphragm, which is caused by a force differential between pressure exerted by the control spring and pressure exerted by the sensed downstream gas, moves the valve disc with respect to a valve seat to control the amount of gas flow from the gas inlet to the gas outlet. In this manner, the valve disc and orifice operate to provide a variable restriction that modulates the flow of gas through the regulator in accordance with the sensed downstream pressure.

Other known gas regulators, such as pilot operated regulators, include a main actuator diaphragm coupled to valve linkage which opens and closes a main gas valve, wherein one side of the actuator diaphragm is exposed to the downstream gas pressure while the other side of the diaphragm is exposed to a loading pressure developed by a pilot valve assembly. The pilot valve assembly typically modulates the upstream gas pressure to develop the loading pressure.

In such gas pressure regulators, a certain amount of operational inaccuracy and reduction in performance is obtained due to the misalignment of regulator components and the amount of adjustment which must be provided in the regulator so as to compensate for such misalignment. Such misalignment of component parts results from manufacturing process tolerances and is obtained for instance in the regulator valve disc assembly where due to the tolerances required in the manufacture of the valve disc components, misalignments between these components commonly occur. As a result, the valve seat for instance must impress further into the valve disc which therefore requires higher forces to operate the regulator. This results in the degrading of key performance characteristics such as inlet pressure sensitivity, high lock-up, and spring range shift.

In an attempt to overcome this problem, some existing fluid pressure regulators include elaborately and precisely machined components, particularly in the valve disc assembly in an attempt to significantly reduce the misalignment condition. This procedure, of course, requires very time consuming and expensive production processes. In other instances, in attempts to reduce this misalignment problem, a ball and socket configuration in the valve disc assembly or in other components has been utilized.

Examples of such ball and socket configurations exist in products manufactured by Fisher Controls International, Inc. Such products include gas regulator valves Type 95H and S102C, and a valve positioner Type 4660.

Typically, a ball and socket configuration is provided on the back side of a disc support member so that the disc can pivot when moved against the valve seat containing the orifice. However, this leads to an undesired amount of friction in the valve disc assembly and requires a larger size disc assembly to accommodate the ball and socket. Furthermore, tight manufacturing tolerances are required on the ball and socket to provide proper pivoting action.

SUMMARY OF THE INVENTION

The present invention is directed to a valve disc assembly for a fluid pressure regulator which provides self-alignment of the valve disc as the valve disc is moved into seating engagement with the valve seat. The self-aligning valve disc assembly incorporates a pivoting action with a point of force inside the diameter of the opposing force of the valve seat. As the valve disc makes contact with the valve seat it pivots about the fulcrum thereby enabling the valve disc to align squarely with the valve seat and provide for even seating of the disc on the seat. This reduces the amount of valve seat impression required for valve seating performance, thereby resulting in lower seating forces and improved regulator performance.

In accordance with one aspect of the invention, a cup-shaped disc holder is attached to the valve actuator stem. The bottom inside floor surface of the disc holder is provided with a mound-like raised central portion. A flat disc member is mounted within the disc holder so that the bottom of the disc engages the central mound protruding from the floor of the disc holder at a single point of contact. The perimeter of the disc is sized with respect to the disc holder so that the disc has a limited freedom of movement within the disc holder.

As the valve actuator moves the valve disc towards the valve seat, the disc contacts the seat. The disc pivots about the center protrusion and the single point of force behind the disc falling inside the diameter of the opposing force of the valve seat enables the pivoting action to result in a self-alignment of the disc to the seating surface. This configuration reduces the seating forces required for the regulator to function properly. Also, placing the fulcrum on the disc holder instead of the disc enables a center of rotation closer to the seat and thereby resulting in less friction and a smaller overall valve disc assembly than with valve disc assemblies incorporating a ball and socket.

The present invention is particularly useful on fluid regulating valves used in the gas and chemical industries where such regulators are required to produce constant controlled outputs under a varying range of conditions such as inlet pressure, demand and temperature shifts. The self-aligning, free floating disc configuration of the present invention is especially useful on pilot valves that send an amplified signal to regulating valves.

A metal disc support member can be utilized between the disc holder and the disc to provide a more consistent pivoting action in view of the softer disc material. The disc and disc support can be maintained within the disc holder by a friction fit, a suitable adhesive, a crimping action, or other suitable mounting configuration. In the preferred embodiment, a disc retainer is used to sandwich the disc between the disc retainer and the disc support after insertion into the disc holder. The perimeter edge of the disc holder may then be crimped over the disc retainer to maintain all of the components in position. Also, the raised central portion of the inside floor of the disc holder is provided by a cone-shaped floor. The cone apex is at the floor center and the floor surface slants away from the apex to the floor perimeter so the desired single point of contact is enabled between the disc and the disc holder at the cone apex.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
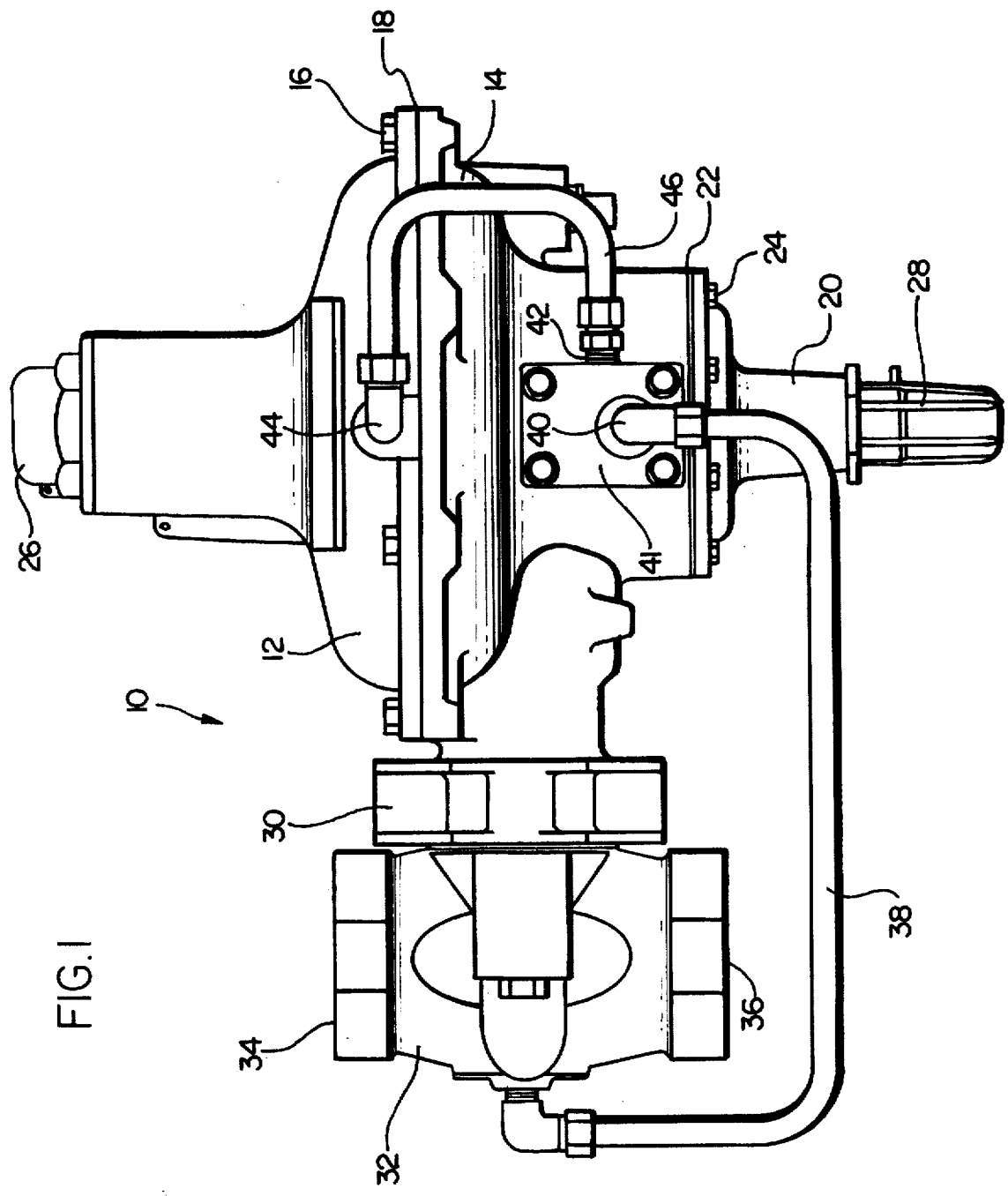
FIG. 1 is a side elevational view illustrating a pilot operated gas pressure regulator including an improved valve disc assembly according to the present invention.

Referring now to FIG. 1, a pilot operated pressure regulator 10 includes an actuator spring casing 12 attached to one side of a regulator body 14 by a series of flange screws 16. An actuator diaphragm 18 is disposed between the spring casing 12 and the regulator body 14. A pilot spring casing 20 is attached to the other side of the regulator body 14 by a set of flange screws 24 with a pilot diaphragm 22 disposed between the pilot spring casing 20 and the regulator body 14. Closing caps 26 and 28, which are removable to allow calibration of the pressure regulator 10, are disposed on the actuator spring casing 12 and the pilot spring casing 20, respectively.

A lower regulator casing 30 is integrally formed with or connected to the regulator body 14 and couples the regulator body 14 to a fluid pipeline fitting 32. The fitting 32 is adapted to transmit a varying amount of fluid, such as gas, from a gas inlet 34 to a gas outlet 36. A pilot supply tube 38 provides fluid communication between the gas inlet 34 and a gas inlet 40 on a pilot control assembly 41. The pilot control assembly 41 includes a gas outlet 42 which is in fluid communication with a gas inlet 44 on the actuator spring casing 12 through a loading tube 46.

Figure 2:
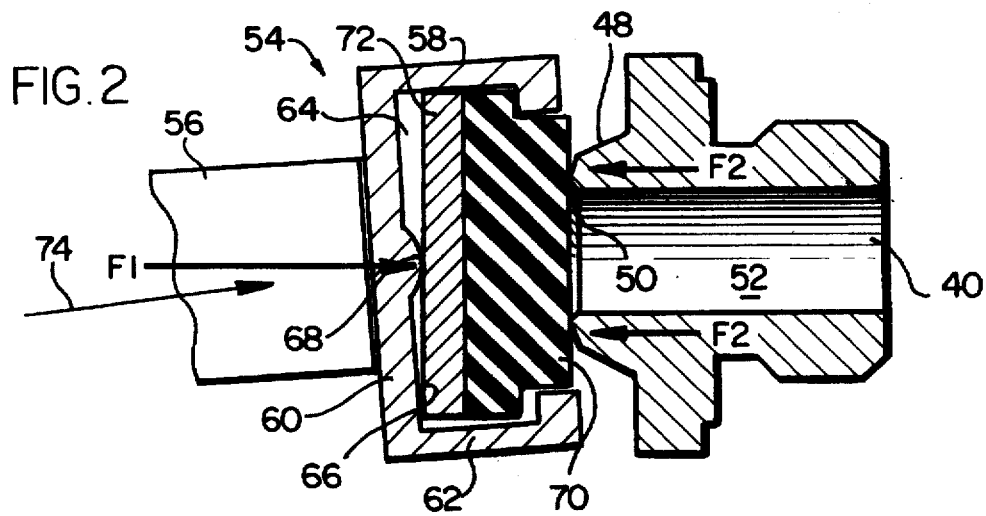
FIG. 2 is a fragmented sectional view illustrating a valve disc assembly according to the invention in engagement with the regulator valve seat.

Referring now to FIG. 2, there is illustrated several components of the pilot control assembly 41, namely, a pilot valve seat 48 containing an orifice 50 at one end and a passageway 52 which communicates with the gas inlet 40. The flow of gas between the gas inlet 40 through the valve seat 48 and to the gas outlet 42 is controlled by a valve disc assembly 54 mounted to a pilot valve stem 56. In accordance with standard pilot regulator type valves, the movement of pilot diaphragm 22 is coupled through a lever arrangement to the valve stem 56 so as to move the valve disc assembly 54 towards or away from the valve seat 48.

The specific operation of the pilot operated pressure regulator 10 shown in FIG. 1 is described in a co-pending application, Ser. No. 08/556,225, assigned to the same assignee as herein.

With respect to the present invention, the valve disc assembly 54 includes a cup-shaped disc holder 58 including a base 60 and upstanding walls 62 defining a chamber 64 therebetween. The base 60 includes a substantially flat floor surface 66 and a central mound-like protrusion 68 extending above the flat surface 66.

A disc member 70 is captured within the disc holder 58 along with a disc support 72 mounted within the disc holder 58 and intermediate the disc 70 and the protruding central portion 68. The disc 70 and disc support 72 are suitably sized with respect to the surrounding walls 62 of the disc holder 58 so that the disc 70 has a limited freedom of movement. Also, there is a substantially single point of contact between the disc support 72 and the protruding central portion 68. Thus, as can be seen in FIG. 2, the valve disc assembly 54 is self-aligning with respect to the valve seat 48, in that there is provided a pivoting action with a point of force F1 which is inside the diameter of the opposing force F2 of the valve seat 48.

As can be seen from FIG. 2, movement of the pilot valve stem 56 in the direction illustrated by reference arrow 74 moves the valve disc assembly 54 towards the valve seat 48 until the disc 70 makes contact with the valve seat. As the valve disc makes contact with the valve seat it pivots about the fulcrum provided at the single point contact of the protruding center portion 68 and the disc holder 72. This enables the valve disc 70 to align itself square to the valve seat 48 and thereby provide for even seating. This reduces the valve seat impression required for regulator performance and thereby resulting in lower forces and improved regulator performance.

The disc holder 58 and the disc support 72 are metal components, whereas the disc 70 is formed of rubber or other type resilient material suitable for fluidly sealing the valve seat 48. The components may all be mounted together and maintained in position by means such as a friction fit, suitable adhesive material, or a crimping action.

Figure 3:
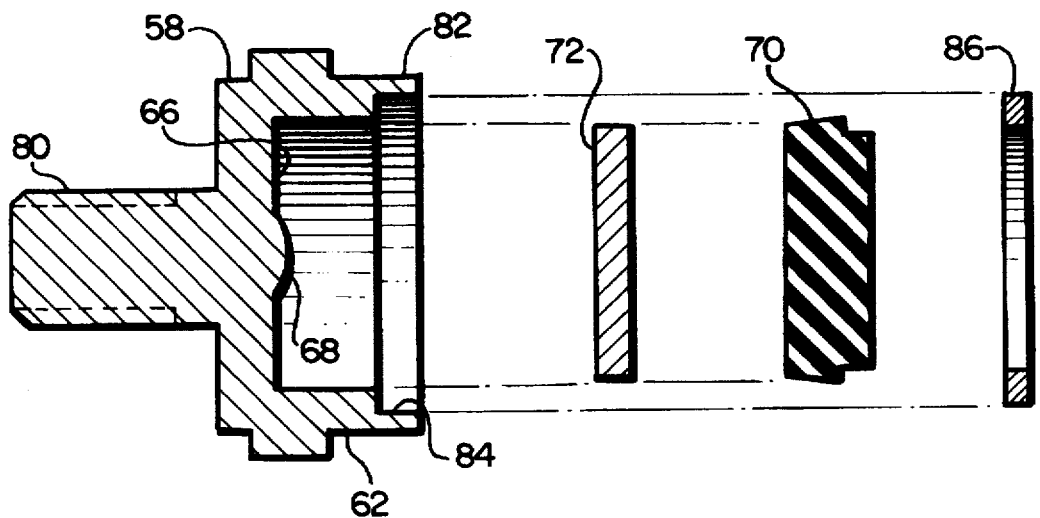
FIG. 3 is an exploded sectional view illustrating an alternative embodiment of a valve disc assembly according to the present invention.
Figure 4:
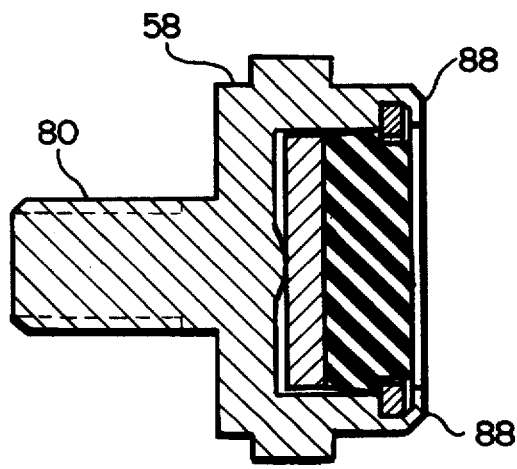
FIG. 4 is a sectional view illustrating the assembled components of the valve disc assembly of FIG. 3.

Referring now to FIG. 3, there is illustrated a preferred embodiment of the invention wherein the valve disc holder 58 includes a threaded stub 80 for threadable attachment to the valve stem 56. The upstanding wall 62 at an upper perimeter portion 82 has been modified to include a cavity 84 to enable crimp mounting of the disc components within the disc holder. As is illustrated in FIGS. 3 and 4, a retainer ring 86 is sized with respect to the perimeter portion 82 and cavity 84 so as to trap the disc 70 and disc support 72 in the disc holder and adjacent to the center protruding portion 68 with a limited degree of movement. With the disc support, disc and retainer mounted within the disc holder, the perimeter portion 82 is then crimped during a crimping operation so that a crimp edge 88 extends over the retainer 86.

In a constructed prototype embodiment of the valve disc assembly shown in FIGS. 3 and 4, the central protuberance 68 was sized so as to extend at its maximum to about 0.005–0.007 inch (0.127–0.178 mm) beyond a 0.430 inch (10.9 mm) diameter flat floor surface 66 at the bottom of the disc holder 58.

Figure 5:
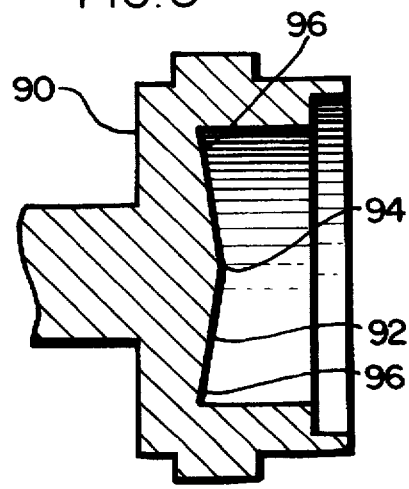
FIG. 5 is a sectional view illustrating the preferred embodiment of a valve disc holder.

In a preferred embodiment in terms of ease of construction, FIG. 5 shows a disc holder 90 which is similar to the disc holder 58, but includes a cone-shaped floor surface 92 for providing the desired raised central floor portion for single point contact with the disc according to the present invention. The cone-shaped floor surface 92 has an apex 94 at the floor center and a sloping floor surface extending from the apex 94 to the cone-shaped floor perimeter 96. The apex 94 provides the desired single point contact with the disc. In a constructed prototype of this cone-shaped floor embodiment, having a 0.430 inch (10.9 mm) inside floor diameter, the apex 94 extended 0.009–0.011 inch (0.229–0.279 mm) beyond the floor perimeter.

It is to be understood that while the present invention has been illustrated and described with respect to a valve disc assembly for a pilot control portion of a pilot operated pressure regulator, the principles hereof can be applied to main valve disc assemblies as well as to other types of fluid regulating valves.

The foregoing detailed description has been given for clearness of understanding only, and no unnecessary limitations should be understood therefrom, as modifications will be obvious to those skilled in the art.

What is claimed is:

1. A valve disc assembly for use with a valve seat in controlling the flow of fluid in a fluid pressure regulator, said valve disc assembly comprising:

a disc formed of resilient material suitable for fluid sealing engagement with the valve seat;

a rigid disc support on one side of said disc opposite said valve seat, a disc holder including a base, and walls extending from the base defining a chamber therebetween, said chamber adapted to insertably receive said disc and disc support with a limited degree of pivoting movement of said disc and disc support within said chamber;

said disc holder including a central portion extending from said base and within said chamber for substantially single point pivoting contact engagement with said disc support; and retaining means for retaining said disc and disc support within said chamber while permitting movable pivoting engagement of said disc with said valve seat to enable pivoting self-alignment of said disc onto said seat.

2. A valve disc assembly according to claim 1, wherein said retaining means includes a disc retainer insertable into said chamber adjacent said disc and opposite from said base, and wherein said walls include a perimeter end sized with respect to said disc retainer to trap said disc and disc support in said disc holder.

3. A valve disc assembly according to claim 2, wherein said perimeter end includes a portion crimped over said disc retainer.

4. A valve disc assembly according to claim 3, wherein said chamber includes a cone-shaped floor with a cone apex at said central portion.

5. In a fluid regulator including a valve seat for controlling the flow of fluid between a fluid inlet and a fluid outlet, the improvement comprising:

a disc for fluid sealing engagement with the valve seat;

a disc holder including a base, and walls extending from the base defining a chamber therebetween said chamber adapted to insertably receive said disc with a limited degree of pivotal movement of said disc within said chamber;

said disc holder base including a cone-shaped floor with a cone apex at the central portion of said base providing substantially single point pivoting contact engagement with said disc; and retaining means for retaining said disc within said chamber while permitting movable pivoting engagement of said disc with said valve seat to enable pivoting self-alignment of said disc onto said seat.

6. A fluid regulator according to claim 5, wherein said retaining means includes crimp means for maintaining said disc within said disc holder.

* * * * *